United States Patent
Kim et al.

(10) Patent No.: US 10,084,199 B2
(45) Date of Patent: Sep. 25, 2018

(54) FUEL CELL STACK ENCLOSURE

(71) Applicants: Hyundai Motor Company, Seoul (KR); Kia Motors Corporation, Seoul (KR)

(72) Inventors: Duck Whan Kim, Seoul (KR); Young Bum Kum, Seoul (KR); Jung Do Suh, Seoul (KR); Yong Suk Heo, Seoul (KR); Jung Han Yu, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 201 days.

(21) Appl. No.: 14/468,717

(22) Filed: Aug. 26, 2014

(65) Prior Publication Data
US 2015/0194696 A1 Jul. 9, 2015

(30) Foreign Application Priority Data
Jan. 7, 2014 (KR) ........................ 10-2014-0001779

(51) Int. Cl.
*H01M 8/24* (2016.01)
*H01M 8/2475* (2016.01)
*B60L 11/18* (2006.01)

(52) U.S. Cl.
CPC ....... *H01M 8/2475* (2013.01); *B60L 11/1898* (2013.01); *H01M 2250/20* (2013.01); *Y02T 90/32* (2013.01); *Y02T 90/34* (2013.01)

(58) Field of Classification Search
CPC ........... B60L 11/1898; H01M 2250/20; H01M 8/2475; Y02E 60/50; Y02T 90/32; Y02T 90/34
See application file for complete search history.

(56) References Cited

U.S. PATENT DOCUMENTS

| | | | |
|---|---|---|---|
| 6,720,101 B1* | 4/2004 | Dong | H01M 8/2475 429/435 |
| 2002/0028370 A1* | 3/2002 | Suenaga | H01M 8/0247 429/434 |
| 2004/0202911 A1* | 10/2004 | Komura | H01M 8/0247 429/454 |
| 2008/0102343 A1* | 5/2008 | Cho | H01M 8/2475 429/469 |

(Continued)

FOREIGN PATENT DOCUMENTS

| | | |
|---|---|---|
| CN | 101170197 A | 4/2008 |
| JP | 2002-042852 A | 2/2002 |
| KR | 10-2009-0115476 | 11/2009 |

(Continued)

*Primary Examiner* — Lingwen R Zeng
(74) *Attorney, Agent, or Firm* — Mintz Levin Cohn Ferris Glovsky and Popeo, P.C.; Peter F. Corless

(57) ABSTRACT

A fuel cell stack enclosure is provided that includes side covers configured to be joined with each of end of a stack module respectively. A lower cover is also configured to be provided under the stack module and formed to partially cover a lower portion and a first side portion of an outer surface of the side cove. An upper cover may be provided over the stack module, and be formed to partially cover an upper portion and a second side portion of the outer surface of the side cover to enclose the stack module along with the lower cover while joining with the side covers.

12 Claims, 6 Drawing Sheets

(56) References Cited

U.S. PATENT DOCUMENTS

2008/0182151 A1* 7/2008 Mizusaki ............ H01M 8/0247
429/457

FOREIGN PATENT DOCUMENTS

| KR | 10-0992737 B1 | 11/2010 |
| KR | 10-2011-0003912 | 1/2011 |
| KR | 10-2012-0046658 | 5/2012 |
| KR | 10-2013-0167271 B1 | 12/2013 |

* cited by examiner

[FIG. 1]
Prior Art
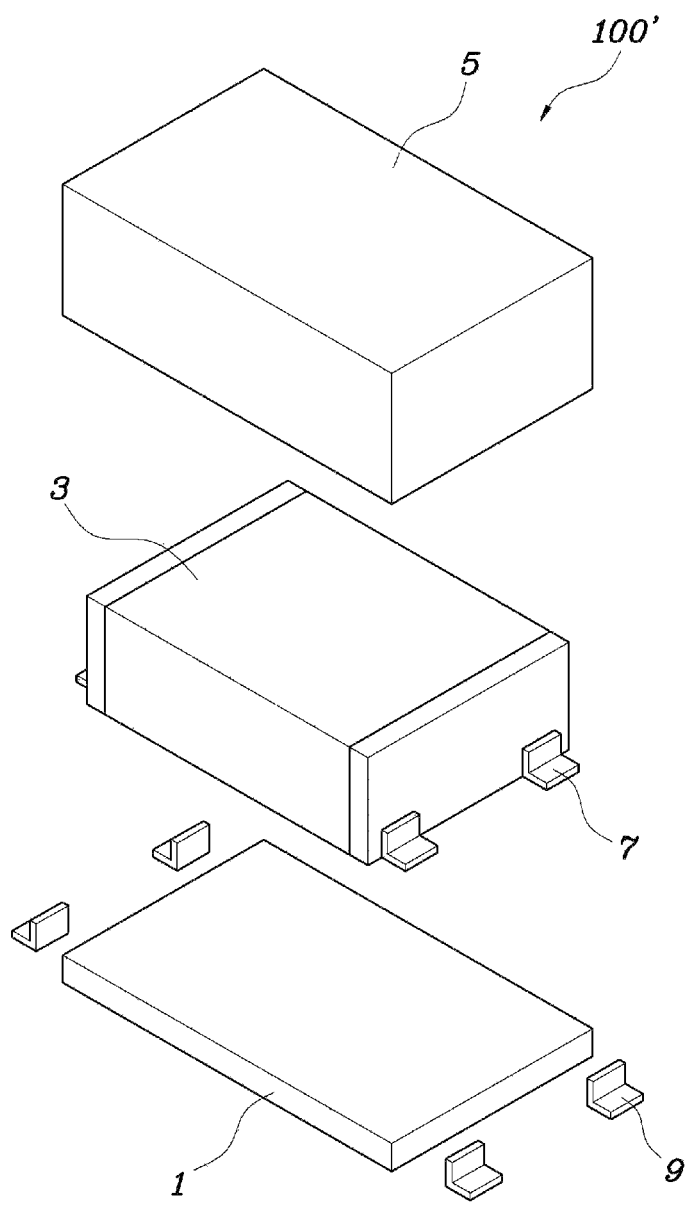

[FIG. 2]
Prior Art
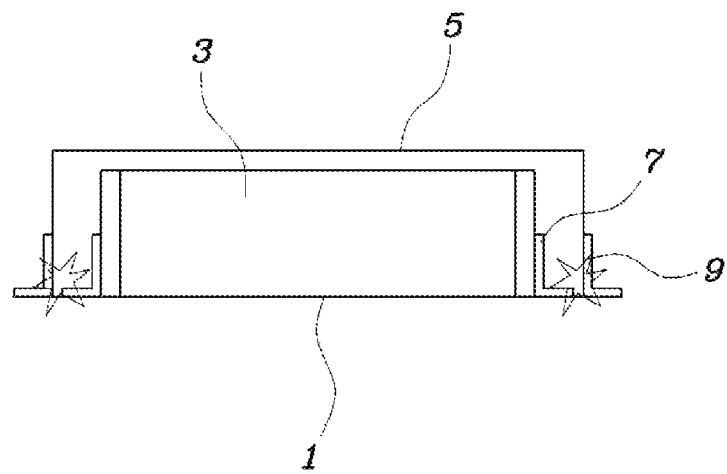
[FIG. 3]
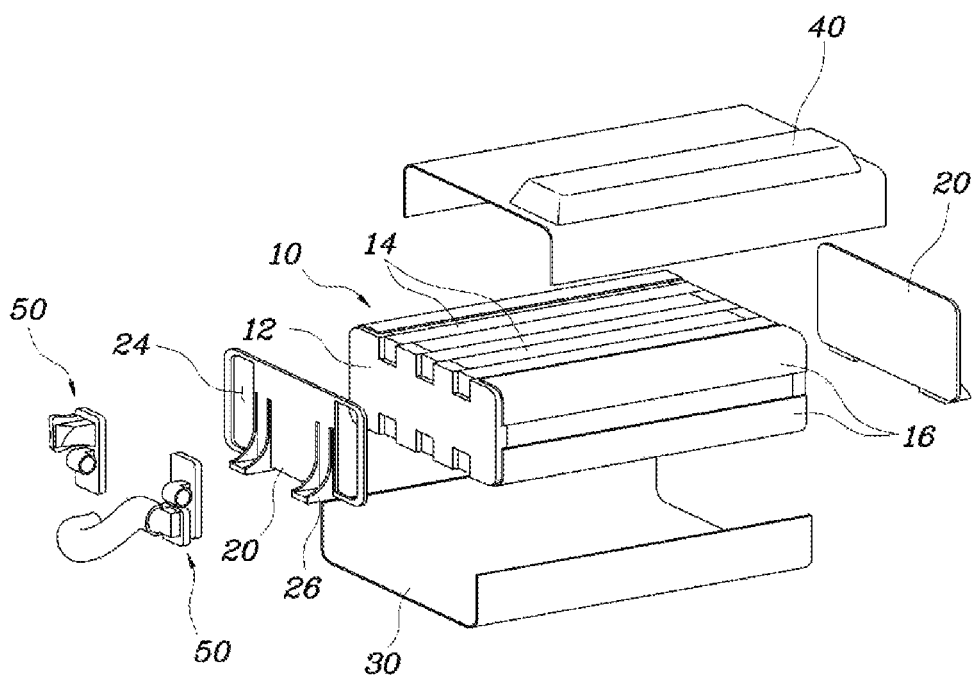

[FIG. 4]
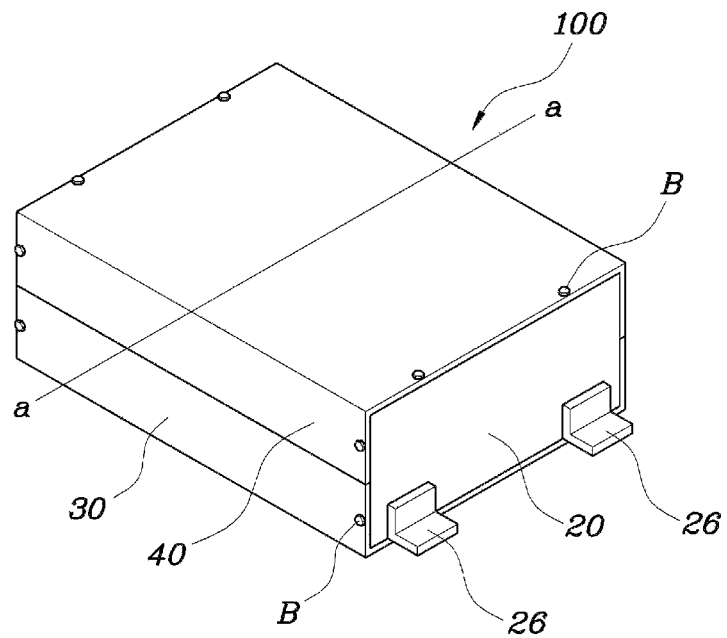

[FIG. 5]
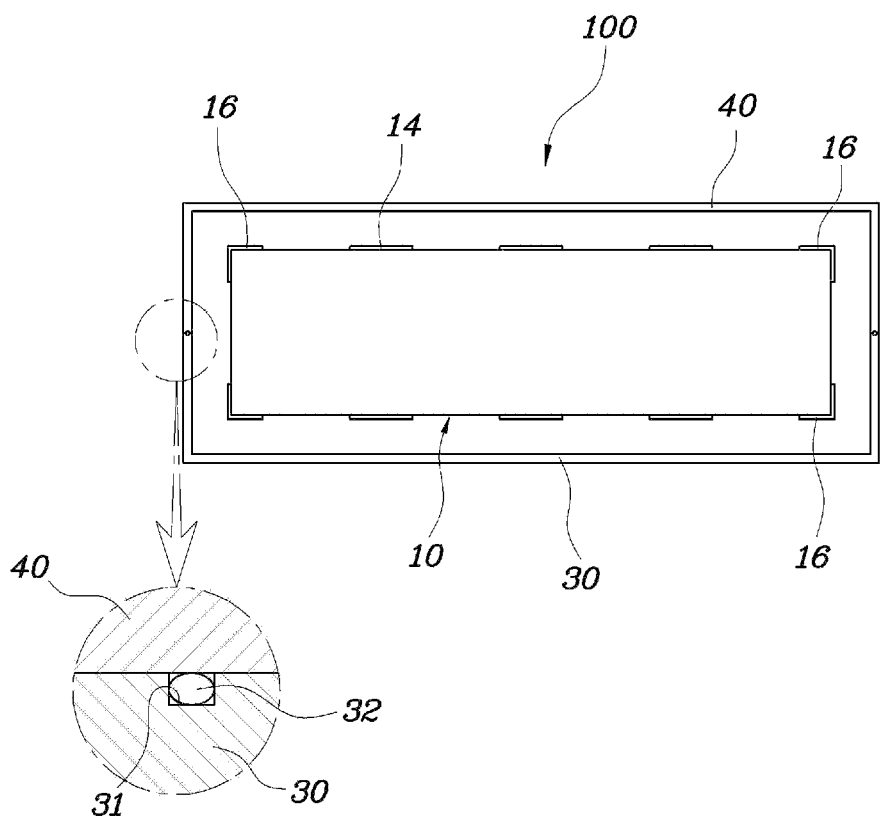

[FIG. 6]
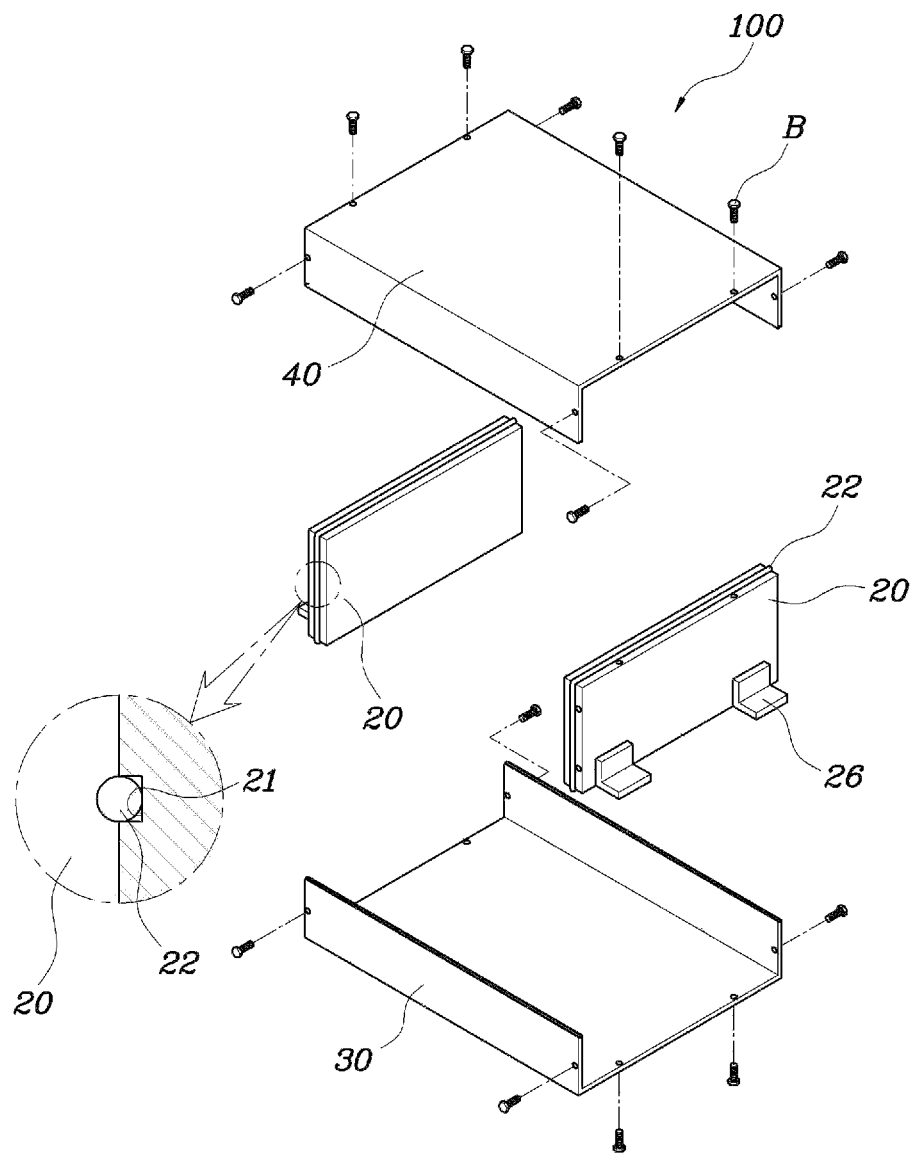

[FIG. 7]
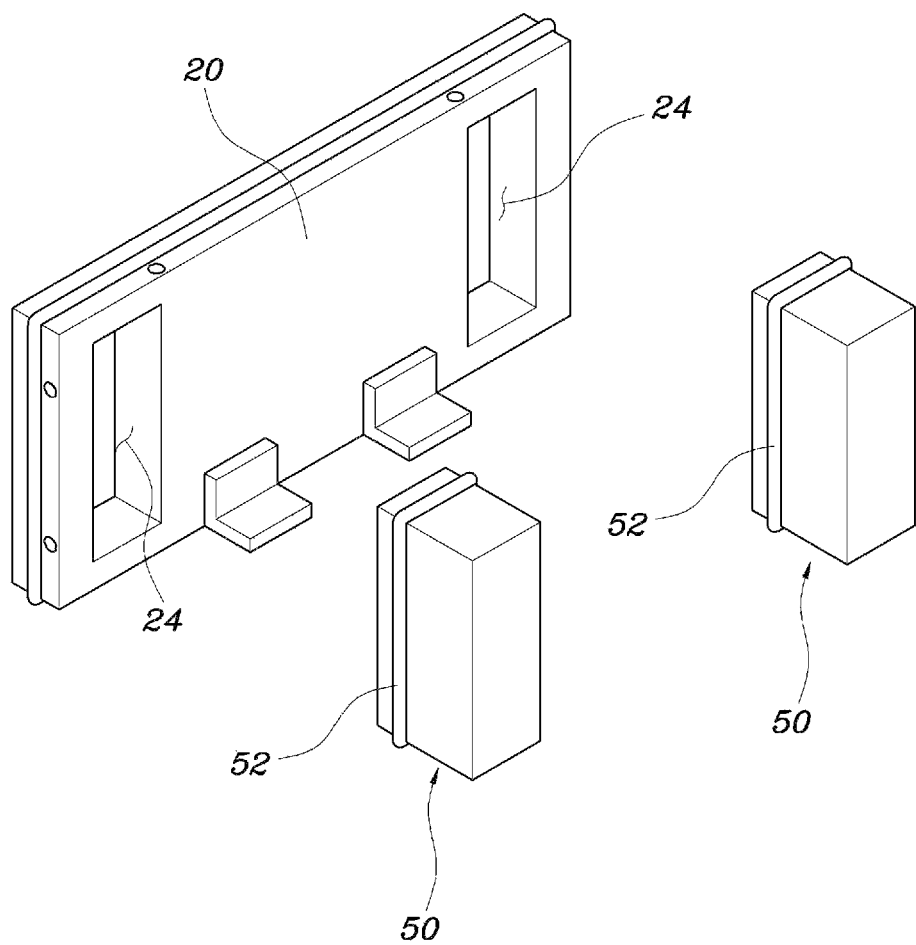

FUEL CELL STACK ENCLOSURE

CROSS REFERENCE TO RELATED APPLICATION

This application claims the benefit of Korean Patent Application No. 10-2014-0001779, filed on Jan. 7, 2014, entitled "Fuel Cell Stack", which is hereby incorporated by reference in its entirety into this application.

BACKGROUND OF THE INVENTION

1. Technical Field

The present invention relates to a fuel cell stack, and more particularly, to a fuel cell stack capable of reducing a volume of an enclosure and securing rigidity of a stack by compactly and integrally assembling a mounting structure of the stack with a minimum number of parts.

2. Description of the Related Art

A fuel cell stack is configured to include a unit module in which a plurality of unit cells are packed into one stack and an enclosure for protecting the unit cells. In some cases, the plurality of unit modules is configured of a single stack.

FIG. 1 illustrates a conventional structure for fixing the stack, in which assembly is finished by fixing a stack module 3 on an enclosure underframe 1 by using a stack module mounting bracket 7 and then covering the stack module 3 with an enclosure cover 5 to protect the stack module 3. Further, an assembled stack 100' is fixed to a vehicle or a frame by using the stack mounting bracket 9 which is formed on a side of the enclosure underframe 1.

However, during vehicle operation, vibrations from external forces that are applied to the vehicle and as a result, movement of the stack occurs within the enclosure in a vertical/horizontal direction. As such, conventionally, the applied forces in the vertical/horizontal direction are applied to the stack mounting bracket 7 due to this movement.

As a result, as illustrated in FIG. 2, the enclosure underframe 1 connecting between the stack mounting bracket 9 and the stack module mounting bracket 7 may be damaged due to a relative movement of the stack module mounting bracket 7 with respect to the stack mounting bracket 9. Therefore, the above problem may be solved by increasing rigidity of the enclosure underframe 1. However, often with increased rigidity comes an increase in the overall weight of the enclosure In addition, the mounting of the stack module and the mounting of the stack are configured separately, such that a dead space for mounting the stack module is necessary, thereby largely increasing the volume of the enclosure.

The matters described as the related art have been provided only for assisting in the understanding for the background of the present invention and should not be considered as corresponding to the related art known to those skilled in the art.

SUMMARY OF THE INVENTION

The present invention has been made in an effort to provide a fuel cell stack capable of reducing a volume of an enclosure and securing rigidity of a stack by compactly and integrally assembling a mounting structure of the stack via a minimum number of parts.

According to an exemplary embodiment of the present invention, there is provided a fuel cell stack, including: side covers configured to be joined with both ends of a stack module; a lower cover configured to be provided under the stack module and formed to partially cover a lower portion of the stack module and a first side portion of an outer surface of the side cover; and an upper cover configured to be provided over the stack module, formed to partially cover an upper portion of the stack module and a second side portion of the outer surface of the side cover to enclose the stack module along with the lower cover, and joined with the side cover.

Furthermore, in some exemplary embodiments of the present invention, the outer surface of the side cover contacting the lower cover and the upper cover may be provided with a first airtight member for sealing.

Likewise the outer surface of the side cover may also be provided with a groove. This groove may be provided with the first airtight member. In some cases, the upper and lower cover may be provided with a groove as well.

In yet other exemplary embodiments of the present invention, the side surface of the lower cover and the upper cover contacting the side cover may be provided with a first airtight member for sealing. In addition, the side surface of the upper and lower cover may be provided with a groove and the groove may be provided with the first airtight member.

Both ends of the stack module may be each joined with endplates and a fastening bar may be fastened between the endplates joined with both ends of the stack module. A reinforcing beam may be further fastened between the endplates in a shape enclosing corners of the endplates. As such, these endplates may be integrally formed with the side covers.

Both ends of the lower cover and both ends of the upper cover may contact each other in a shape in which they are supported to each other so as to enclose the stack module and a second airtight member may be mounted at a contact portion between the lower cover and the upper cover to seal the portion.

Any portion of the contact surface between the lower cover and the upper cover may be provided with a groove and thus the groove may be provided with the second airtight member. The side covers may be joined with the lower cover and the upper cover covering the outer surfaces of the side covers by bolting.

A mounting aperture may be provided in a shape penetrating through the side cover and the mounting aperture may be provided with an interface and thus the interface may be joined with the stack.

An outer surface of the interface may be assembled with a third airtight member and the third airtight member may be fitted in the mounting aperture when the third airtight member is sealed in an inner surface of the mounting aperture.

The side cover and the interface may be composed of one body and or may be integrally formed with the mounting bracket. Also, a side surface of the side cover may be provided with a mounting bracket.

BRIEF DESCRIPTION OF THE DRAWINGS

The above and other objects, features and advantages of the present invention will be more clearly understood from the following detailed description taken in conjunction with the accompanying drawings, in which:

FIG. 1 is a view for describing a structure for mounting a stack according to the related art;

FIG. 2 is a view for describing a principle of damaging a portion in which a stack is mounted according to the related art;

FIG. 3 is a view illustrating a separated structure of a fuel cell stack according to an exemplary embodiment of the present invention;

FIG. 4 is a view illustrating a joined state of a lower cover and an upper cover with side covers in the fuel cell stack according to the exemplary embodiment of the present invention;

FIG. 5 is a cross-sectional view taken along the line a-a of FIG. 4;

FIG. 6 is a view for describing an airtight joint relationship between an airtight member mounted on the side cover and the lower cover and a joint relationship in which the lower cover and the upper cover are fastened with the side covers with a securing mechanism, according to the exemplary embodiment of the present invention; and FIG. 7 is a view for describing a joint relationship of an endplate and an interface with the side covers, according to the exemplary embodiment of the present invention.

DESCRIPTION OF THE PREFERRED EMBODIMENTS

Exemplary embodiments of the present invention will be described below in detail with reference to the accompanying drawings.

It is understood that the term "vehicle" or "vehicular" or other similar tem as used herein is inclusive of motor vehicles in general such as passenger automobiles including sports utility vehicles (SUV), buses, trucks, various commercial vehicles, watercraft including a variety of boats and ships, aircraft, and the like, and includes hybrid fuel cell vehicles, electric fuel cell vehicles, plug-in hybrid electric fuel cell vehicles, hydrogen-powered fuel cell vehicles and other types of fuel cell vehicles (e.g. any vehicle with at least one fuel cell installed therein).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

FIG. 3 is a view illustrating a separated structure of a fuel cell stack according to an exemplary embodiment of the present invention, FIG. 4 is a view illustrating a joined state of a lower cover and an upper cover with side covers in the fuel cell stack according to the exemplary embodiment of the present invention, FIG. 5 is a cross-sectional view taken along the line a-a of FIG. 4, FIG. 6 is a view for describing an airtight joint relationship between an airtight member mounted on the side cover and the lower cover and a joint relationship in which the lower cover and the upper cover are fastened with the side covers with a securing mechanism, according to the exemplary embodiment of the present invention, and FIG. 7 is a view for describing a joint relationship of an endplate and an interface with the side covers, according to the exemplary embodiment of the present invention.

An enclosure for a fuel cell stack 100 according to an exemplary embodiment of the present invention is configured to include side covers 20, a lower cover 30, and an upper cover 40.

Describing in detail an exemplary embodiment of the present invention with reference to FIGS. 3 to 7, the enclosure for the fuel cell stack 100 is configured to include side covers 20 which are joined with both ends of a stack module 10 (i.e., abutting the endplates of the fuel cell stack), a lower cover 30 which is disposed under the stack module 10 and is formed to partially cover a lower portion and a first side portion of an outer surface of the side covers 20, and an upper cover 40 which is disposed over the stack module 10 and is formed to partially cover an upper portion and a second side portion of the outer surface of the side covers 20 to enclose the stack module 10 along with the lower cover 30. The upper cover 40 is also joined with the side covers 20.

That is, the enclosure having the stack module 10 embedded therein is assembled by directly joining the side covers 20 with both ends of the stack module 10 and joining the lower cover 30 and the upper cover 40 with the outer surface of the side cover 20 in a thereby enclosing the stack module 10 to largely reduce a dead space in the enclosure for mounting the stack module 10, thereby reducing the overall volume of the enclosure. Also, the stack module 10, the lower cover 30 and the upper cover 40 are joined with the side covers 20 to integrally configure the enclosure, thereby securing rigidity of the stack 100 without increasing the overall weight.

Referring to FIG. 6, the outer surfaces of the side covers 20 contacting the lower cover 30 and the upper cover 40 may be mounted to be sealed by a first airtight member 22. In detail, a groove 21 may be formed along the outer surface of the side cover 20, such that a portion of the first airtight member 22 may be fitted in the groove 21. Herein, the first airtight member 22 may be a packing having a band or elastic circular shape so as to be fitted in the groove 21.

That is, a portion at which the outer surfaces of the side covers 20 meet an inner surface of the lower cover 30 and an inner surface of the upper cover 40 may be provided with the first airtight member 22 for sealing, such that the first airtight member 22 is pressed while the lower cover 30 and the upper cover 40 are mounted or fixed, thereby implementing airtight and watertight actions.

Referring to FIG. 6, according to the exemplary embodiment of the present invention, the side covers 20 may be joined with portions of the lower cover 30 and the upper cover 40, which cover the outer surfaces of the side covers 20, by securing mechanisms such as screws, bolts etc.

Referring to FIG. 3, according to the exemplary embodiment of the present invention, end plates 12 are each joined with both ends of the stack module 10 and a plurality of fastening bars 14 may be fastened between the end plates 12 joined with both ends of the stack module 10. A 'L'-shaped reinforcing beam 16 may be further fastened between the end plates 12 to enclose corners of the end plates 12.

Further, the end plate 12 and the side cover 20, which are provided separately, may be joined with each other and in some cases, may be integrally formed.

That is, the end plates 12 may be joined at both sides of a plurality of unit cells configured as the stack module 10 and are pressed up to a required pressure and then may be fastened with each other by using the fastening bars 14. In this case, the stack module 10 itself is able to maintain a certain degree of rigidity, but may be deformed due to vibrations or impact.

To supplement this, the side covers 20 are integrally fixed to the end plates 12 and then the lower cover 30 and the upper cover 40 are joined with the side covers 20 by using a securing mechanism B, thereby forming the fully integrated structure.

Further, the stack module 10 is fastened by the fastening bar 14 and thus the stack module 10 has a quadrangular beam shape, such that the stack module may secure rigidity. In addition, the "L"-shaped reinforcing beam 16 is additionally mounted on the side of the stack module 10, such that the rigidity of the stack 100 may be secured.

Referring to FIGS. 4 and 5, according to the exemplary embodiment of the present invention, both ends of the lower cover 30 and both ends of the upper cover 40 contact each other in a shape in which they are supported to each other so as to enclose the stack module 10 and a second airtight member 32 may be mounted at a contact portion between the lower cover 30 and the upper cover 40 so as to seal the portion.

In detail, any portion of the contact surface between the lower cover 30 and the upper cover 40 may be provided with the groove 31 and thus the groove 31 may be provided with the second airtight member 32. Herein, the groove 31 may be formed in the lower cover 30 and the second airtight member 32 may be a packing having a band or elastic circular shape to be fitted in the groove 31.

That is, the second airtight member 32 for sealing is mounted at a portion at which both ends of the lower cover 30 abuts both ends of the upper cover 40, such that the second airtight member 22 is pressed while the lower cover 30 and the upper cover 40 are mounted to be fixedly joined with each other, thereby implementing airtight and watertight characteristics.

Referring to FIG. 7, according to the exemplary embodiment of the present invention, a mounting aperture 24 is mounted to penetrate through the side cover 20 and the mounting aperture 24 is provided with the interface 50, such that the interface 50 may be joined with the stack 100. Herein, the interface 50 may be joined with the end plates 12 which are joined with both ends of the stack 100.

In detail, a third airtight member 52 is assembled with the outer surface of the interface 50 and the third airtight member 52 may be fitted in the mounting aperture 24 when the third airtight member 52 is sealed in an inner surface of the mounting aperture 24. Herein, the third airtight member 52 may be a packing having a band or elastic circular shape so as to be mounted along the circumference of the outer surface of the interface 50.

That is, the third airtight member 52 for sealing is mounted at the portion at which the inner surface of the mounting aperture 24 abuts the outer surface of the interface 50, such that the third airtight member is pressed while the interface 50 being fitted in the mounting aperture 24, thereby implementing the airtight and watertight actions.

Referring to FIGS. 3 and 4, a side lower end of the side cover 20 may be provided with the mounting bracket 26. This side cover 20 may be joined with a vehicle body or may be a separate frame through the mounting bracket 26, such that the stack 100 may be fixed to the vehicle.

Additionally herein, the side cover 20 may be integrally formed with the mounting bracket 26, such that the rigidity of the enclosure is improved.

According to the exemplary embodiments of the present invention, the dead space in the enclosure for mounting the stack module may be significantly reduced by directly joining the side covers with both ends of the stack module. Additionally, the lower cover and the upper cover are joined on the outer surfaces of the side covers so as to enclose the stack module, thereby reducing the overall volume of the enclosure. Finally, the enclosure is integrally configured by joining the stack module, the lower cover, and the upper cover with the side covers, thereby securing the rigidity of the mounting structure of the stack.

Meanwhile, although specific examples of the present invention have been described above in detail, it is obvious to those skilled in the art that various modifications and alterations may be made without departing from the spirit and scope of the present invention. In addition, it is obvious that these modifications and alterations are within the following claims.

What is claimed is:

1. A fuel cell stack, comprising:
    side covers configured to be joined with each of the ends of a stack module respectively;
    a lower cover configured to be provided under the stack module and formed to partially cover a lower portion and a first side portion of an outer surface of at least one of the side covers; and
    an upper cover configured to be provided over the stack module, formed to partially cover an upper portion and a second side portion of the outer surface of the side cover to enclose the stack module along with the lower cover, and join the side covers,
    wherein the outer surface of the side covers contacting the lower cover and the upper cover is provided with a first airtight member for sealing,
    wherein the outer surface of the side cover is provided with a groove and the groove is provided with the first airtight member,
    wherein a mounting aperture is provided in a shape penetrating through the side cover, and the mounting aperture is provided with an interface and the interface is joined with the stack module,
    wherein an outer surface of the interface is assembled with a third airtight member, and the third airtight member is fitted in the mounting aperture when the third airtight member is sealed in an inner surface of the mounting aperture, and
    wherein a pipe is attached to the interface of the third airtight member.

2. A fuel cell stack, comprising:
    side covers configured to be joined with each of the ends of a stack module respectively;
    a lower cover configured to be provided under the stack module and formed to partially cover a lower portion and a first side portion of an outer surface of at least one of the side covers; and
    an upper cover configured to be provided over the stack module, formed to partially cover an upper portion and a second side portion of the outer surface of the side cover to enclose the stack module along with the lower cover, and join the side covers,
    wherein the outer surface of the side covers contacting the lower cover and the upper cover is provided with a first airtight member for sealing,
    wherein the outer surface of the side cover is provided with a groove and the groove is provided with the first airtight member,
    wherein a mounting aperture is provided in a shape penetrating through the side cover, and the mounting aperture is provided with an interface and the interface is joined with the stack module,
    wherein an outer surface of the interface is assembled with a third airtight member, and the third airtight member is fitted in the mounting aperture when the third airtight member is sealed in an inner surface of the mounting aperture, wherein a pipe is attached to the interface of the third airtight member, and wherein both ends of the stack module each abut end plates of the stack module, and a fastening bar is fastened between the end plates.

3. The fuel cell stack of claim 2, wherein the endplates are integrally formed with the side covers.

4. The fuel cell stack of claim 1, wherein both ends of the lower cover and both ends of the upper cover contact each other in a shape that supports each other to enclose the stack module, and a second airtight member is mounted at a contact portion between the lower cover and the upper cover to seal the contact portion.

5. The fuel cell stack of claim 4, wherein any portion of the contact surface between the lower cover and the upper cover is provided with a groove and the groove is provided with the second airtight member.

6. The fuel cell stack of claim 1, wherein the side covers are joined with the lower cover and the upper cover to cover the outer surfaces of the side covers by securing mechanisms.

7. The fuel cell stack of claim 1, the side cover and interface are one body.

8. The fuel cell stack of claim 1, wherein a side of the side cover is provided with a mounting bracket.

9. The fuel cell stack of claim 7, wherein the side cover is integrally formed with the mounting bracket.

10. The fuel cell stack of claim 1, wherein the side surface of the upper and lower cover is provided with a groove and the groove is provided with the first airtight member.

11. The fuel cell stack of claim 1, wherein the side surface of the lower cover and the upper cover contacting the side cover is provided with a first airtight member having sealing properties.

12. The fuel cell stack of claim 2, wherein a reinforcing beam is further fastened between the end plates in a shape enclosing corners of the endplates.

* * * * *